(12) United States Patent
Harman

(10) Patent No.: US 6,442,198 B1
(45) Date of Patent: Aug. 27, 2002

(54) METHOD AND APPARATUS FOR STABILIZING A DECISION FEEDBACK EQUALIZER

(75) Inventor: Dale Douglas Harman, Freehold, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/182,885

(22) Filed: Oct. 30, 1998

(51) Int. Cl.[7] .............................. H03H 7/30; H03H 7/40; H03K 5/159
(52) U.S. Cl. ........................ 375/233; 375/229; 375/232
(58) Field of Search .................. 375/233, 229, 375/348, 291, 232, 342, 341; 348/607; 455/130

(56) References Cited

U.S. PATENT DOCUMENTS

| | | | |
|---|---|---|---|
| 4,376,308 A | | 3/1983 | McNair ........................ 375/14 |
| 4,384,355 A | | 5/1983 | Werner ........................ 375/14 |
| 5,414,733 A | * | 5/1995 | Turner ........................ 375/233 |
| 5,751,768 A | | 5/1998 | Guglielmi et al. .......... 375/234 |
| 6,069,917 A | * | 5/2000 | Werner et al. .............. 375/233 |

OTHER PUBLICATIONS

R.D. Gitlin, H. C. Meador, and S. B. Weinstein "The Tap–Leakage Algorithm: An Algorithm for the Stable Operation of a Digitally Implemented, Fractional Spaced, Adaptive Equalizer," B.S.T.J. vol. 61, No. 8 (Oct. 1982) pp. 1817–1839.

* cited by examiner

Primary Examiner—Stephen Chin
Assistant Examiner—Heechal Kim

(57) ABSTRACT

Taps of a decision feedback equalizer (DFE) are stabilized by adding a small amount of noise to the feedback data symbols. In particular, a DFE structure comprises a feedforward filter, slicer, feedback filter and further includes a noise source. The noise source adds noise to the sliced data signal (provided by the slicer) before further processing by the feedback filter.

7 Claims, 3 Drawing Sheets

100

METHOD AND APPARATUS FOR STABILIZING A DECISION FEEDBACK EQUALIZER

FIELD OF THE INVENTION

This invention relates generally to filters and, more particularly, to adaptive equalizers.

BACKGROUND OF THE INVENTION

Tap drifting in an adaptive equalizer has been a problem from the very beginning of their use. A number of solutions have been proposed by those in the art for solving the tap drifting problem. For example, the use of the tap-leakage method (e.g., see R. D. Gitlin, H. C. Meadors, and S. B. Weinstein "*The Tap-Leakage Algorithm: An Algorithm for the Stable Operation of a Digitally Implemented, Fractionally Spaced, Adaptive Equalizer*," B. S. T. J. Vol. 61 No. 8 (October 1982) pp. 1817–1839); adding out-of-band noise (e.g., see U.S. Pat. No. 4,384,355 issued May 17, 1983, entitled "Control of coefficient drift for fractionally spaced equalizers", and U.S. Pat. No. 4,376,308 issued Mar. 8, 1983, entitled "Control of Coefficient Drift For Fractionally Spaced Equalizers"); and processing the received signal with a whitening filter before equalization (e.g., see U.S. Pat. No. 5,751,768 issued May 12, 1998, entitled "Fractionally spaced equalizing circuits and method").

SUMMARY OF THE INVENTION

Unfortunately, I have observed that tap drifting seems to be compounded in filter structures that incorporate a feedback filter such as an adaptive decision feedback equalizer (DFE). As such, I have realized that the above-mentioned solutions to tap drifting in an equalizer may not always yield the best results in the case of a DFE. Therefore, I have discovered a new method for stabilizing an adaptive filter such as a DFE. In particular, and in accordance with the principles of the invention, taps of a DFE are stabilized by adding a small amount of noise to the feedback data symbols.

In an embodiment of the invention, a decision feedback equalizer structure comprises a feedforward filter, slicer, feedback filter and further includes a noise source. The noise source adds noise to the sliced data signal (provided by the slicer) before further processing by the feedback filter. This is sufficient to stop the tap drifting and stabilize the DFE. The amount of noise added is small enough that it has a negligible effect on overall system performance.

DETAILED DESCRIPTION

I have observed that a DFE may become unstable when the feedback taps are left idle, e.g., when the communications channel does not have significant distortion. Indeed, for a DFE tap-drifting appears to be the result of fighting between the feedback taps and the feedforward taps. This fighting occurs in the region of time which is overlapped between the feedforward and feedback filters. During instability, these few taps grow to the limits of the arithmetic. (Typically, a specific filter implementation uses saturation arithmetic so that the taps are not allowed to overflow but just saturate at the maximum value.) When there is observed tap growth the mean-squared error slightly increases and there is approximately a 1 dB loss in error performance. This form of instability is not catastrophic, but is performance limiting since the mean-squared error and the bit-error rate performance stay at this degraded level forever. Unfortunately, the above-mentioned prior art solutions to tap drifting in an equalizer may not always yield the best results in the case of a DFE. Therefore, I have discovered a new method for stabilizing an adaptive filter such as a DFE. In particular, and in accordance with the principles of the invention, taps of a DFE are stabilized by adding a small amount of noise to the feedback data symbols.

Figure 1:
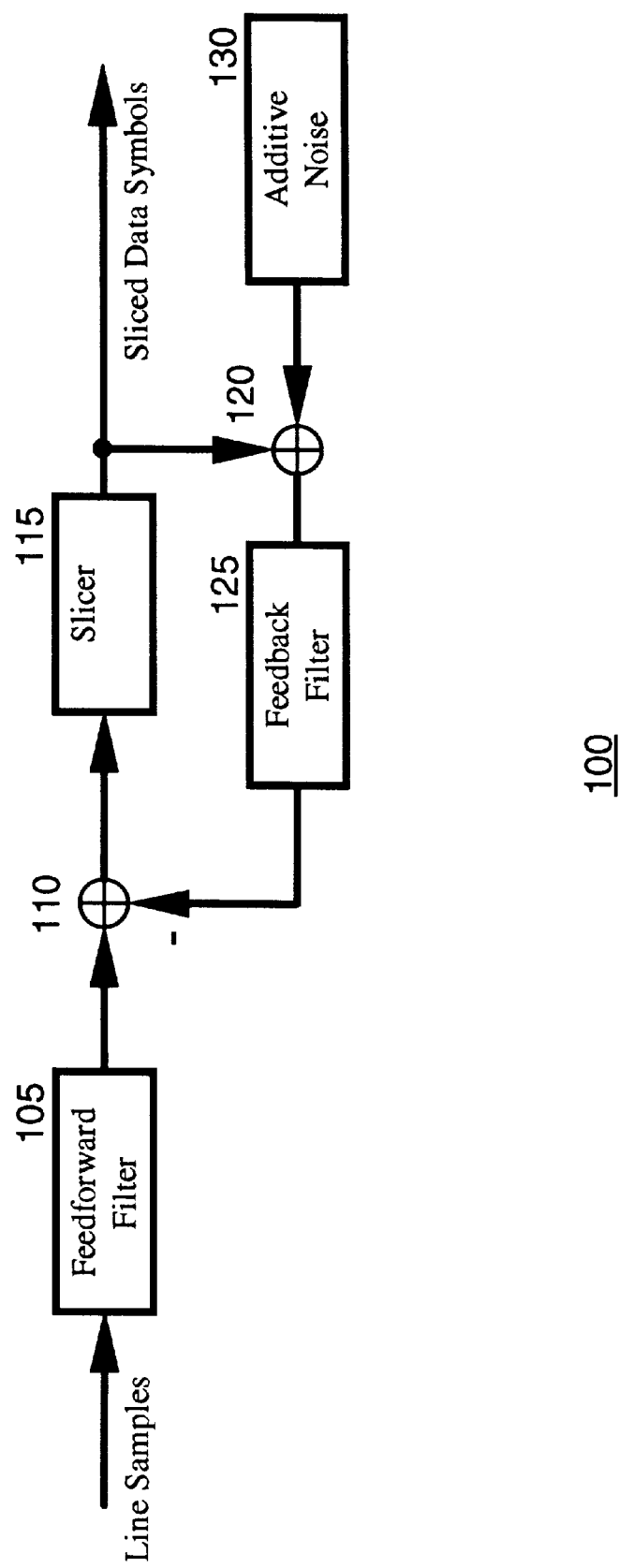
FIG. 1 shows an illustrative decision feedback equalizer structure in accordance with the principles of the invention.

An illustrative embodiment of a DFE in accordance with the principles of the invention is shown in FIG. 1. DFE 100 comprises feedforward filter 105, slicer 115, feedback filter 125, adders 110 and 120, and additive noise source 130. Other than the inventive concept, the elements shown in FIG. 1 are well-known and will not be described in detail. For example, feedforward filter 105 is a fractionally spaced equalizer. (In this case, it should be noted that a sampler (not shown) samples the output signal from feedforward filer 105 before application to adder 110.) Line samples representative of a received signal (not shown) are applied to feedforward filter 105, which removes a portion of the intersymbol interference (ISI) present in the received signal. The output signal from feedforward filter 105 is applied to adder 110, which, theoretically, subtracts the remaining portion of ISI removed by feedback filter 125. The output signal from adder 110 is applied to slicer 115. The latter selects a particular data symbol as a function of the mapping of the signal provided by adder 110 to a point in a predefined constellation (not shown). Slicer 115 provides a sliced data signal comprising a data symbol every T seconds, where 1/T is the data symbol rate. Each data symbol is an estimate of the corresponding received symbol and is provided by slicer 115 for processing by other circuitry (not shown) to recover the actual transmitted data. The sliced data signal is also applied, in accordance with the principles of the invention to adder 120, which adds a noise signal to the sliced data signal. The combined sliced data signal plus noise signal is processed by feedback filter 125, which, as noted above, provides an estimate of the remaining portion of ISI present in the received signal. In accordance with the inventive concept, the addition of a small amount of noise to the sliced data symbols appears to eliminate the fighting between feedforward filter 105 and feedback filter 125. As a result, tap drifting in a DFE is eliminated.

It should be noted that adding noise to the sliced data symbols would appear, at first glance, to cancel one of the advantages of using a DFE structure, namely the low precision required for the data samples in the feedback filter. (Since the sliced data symbols are noise free, the sliced values are typically be represented by a few bits. This results in a simple implementation for the multipliers.) Consequently, and in accordance with the invention, the noise is represented by one additional bit to keep the implementation simple. Illustratively, feedback filter 125 comprises a 2 bit by 8 bit multiplier for implementing a finite impulse response (FIR) filter. (For example, if the added noise is hex 0x0001, and the sliced data symbol values are hex 0x1000 and 0x3000, the added noise is about 12 bits less than the signal level. This represents a signal to noise ratio of around 40 dB. This is likely to be well below the overall noise floor of the system and in fact does not show up at all in the measure of the mean squared error.)

Figure 2:
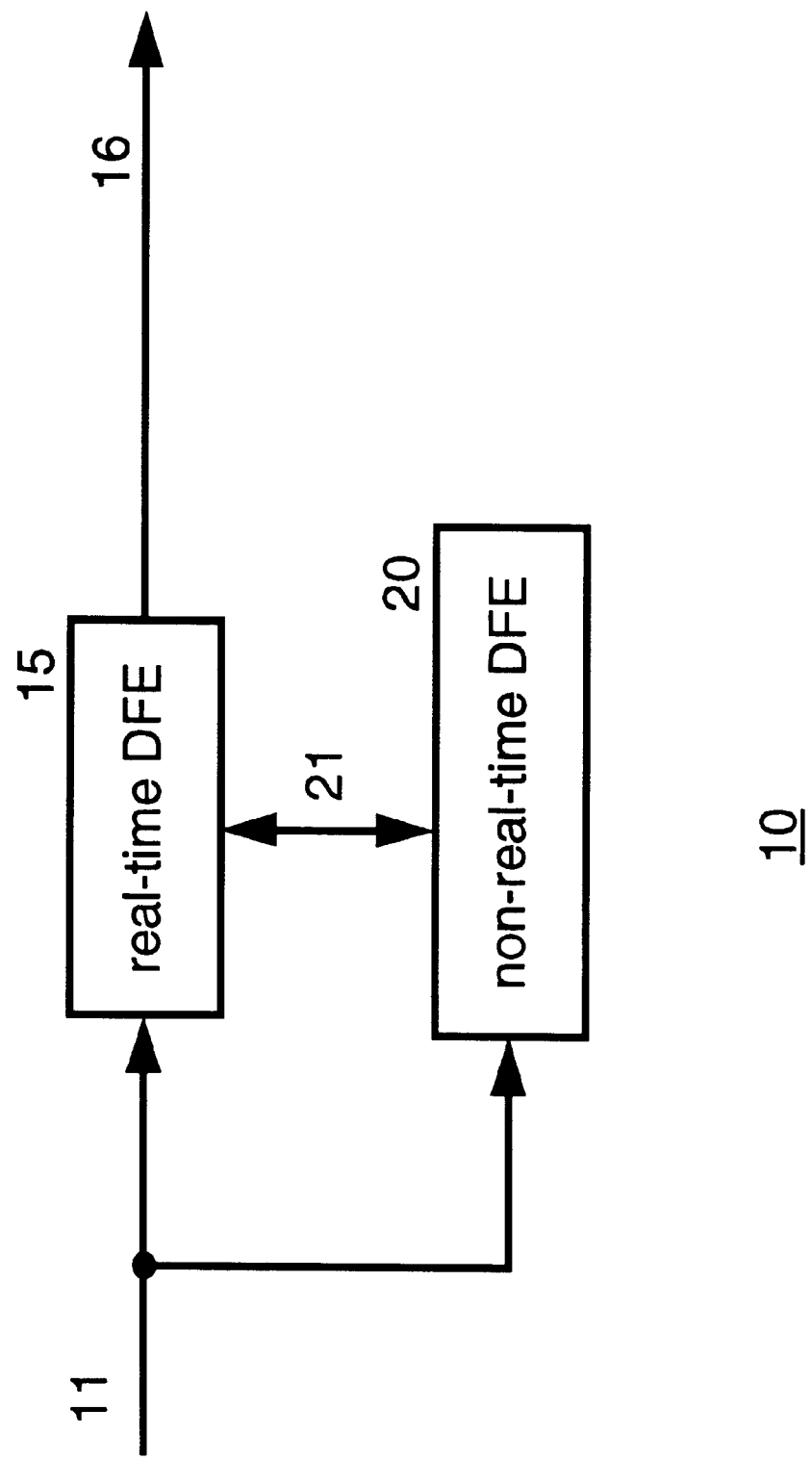
FIGS. 2–3 are other illustrative embodiments of the inventive concept.

An alternative implementation is shown in FIG. 2. DFE 10 uses a parallel qualizer structure comprising a real-time DFE 15 and a non-real-time DFE 20. Real-time DFE 15 is implemented in hardware, operates at a symbol rate 1/T, is non-adaptive, and equalizes applied signal 11 to provide equalized output signal 16. Non-real-time DFE 20 is a digital signal processor (DSP) (e.g., a 16-bit DSP such as the DSP 1611 available from Lucent Technologies, Inc.) and does not operate in real-time. Non-real-time DFE 20 is adaptive. Tap coefficient values are copied into real-time DFE 15 via signal path 21. (The latter is representative of one or more connections between the equalizers). In accordance with the inventive concept, the additive noise source is implemented within non-real-time DFE 20. In particular, the additive noise signal is implemented as a white binary distribution using the following lines of DSP code:

```
/* additive noise for feedback symbols */
    # define NOISE 0x0001;
    y=NOISE;
    a1=y; and
    if(heads) a1=-a1;
``` where y is a variable set equal to the base noise value, which, as shown, is illustratively defined as having a value of one (the least significant bit (LSB) of the 16 bit data precision), and a1 is a variable for storing the current noise value. As can be seen, the current noise value, a1, is set as a function of "if(heads)", which randomly changes the noise value, where heads is a random variable with values "true" or "false." This leaves the noise in a1 and it can then be added to the received symbols. The noise is randomly a plus or minus one. As such, the noise is not added to the real-time equalizer and does not effect the received symbols.

Figure 3:
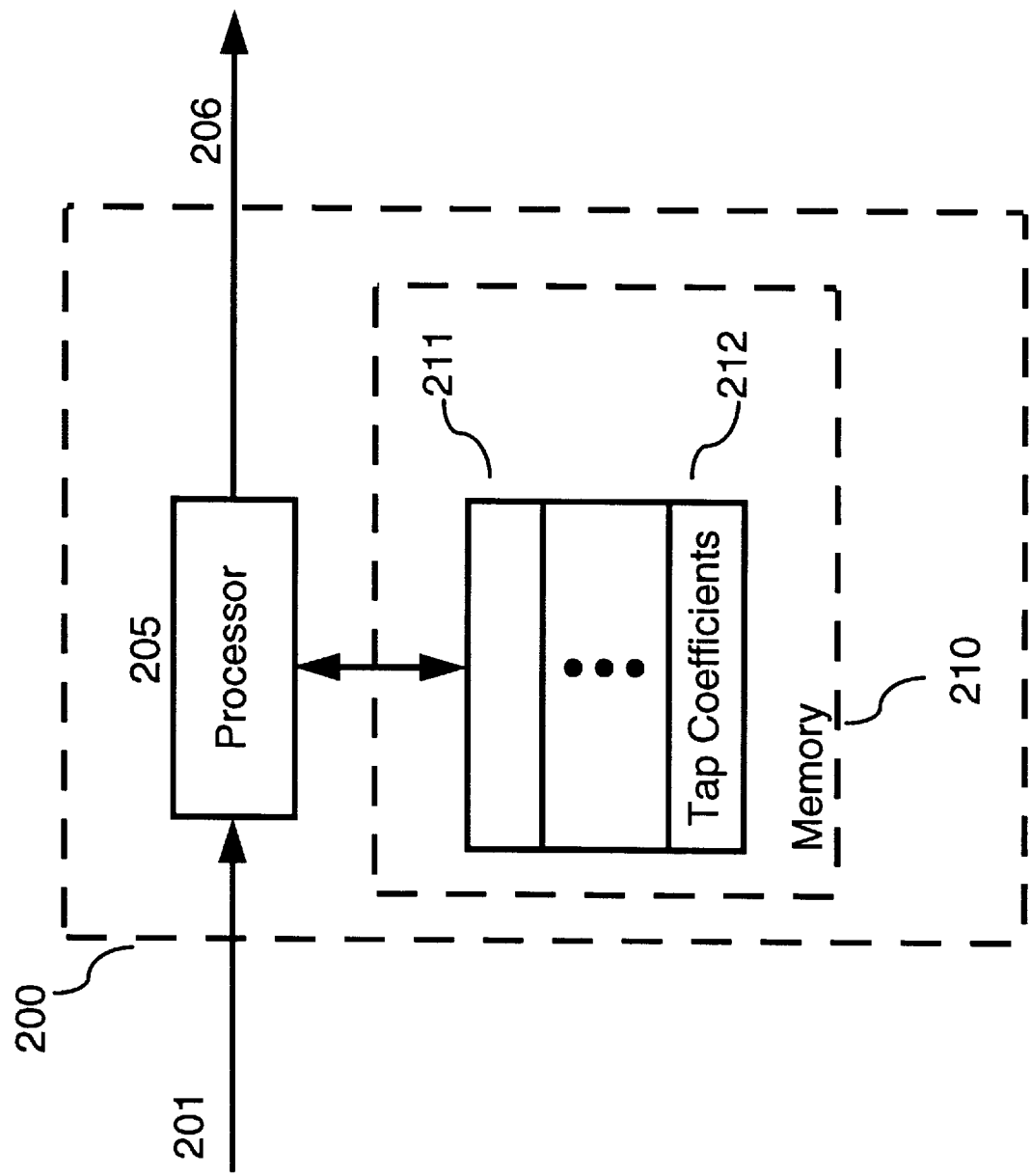

Another illustrative embodiment of the inventive concept is shown in FIG. 3. FIG. 3 illustrates an embodiment representative of a digital signal processor 200 that is programmed to implement an DFE in accordance with the principles of the invention. Digital signal processor 200 comprises a central processing unit (processor) 205 and memory 210. A portion of memory 210 is used to store program instructions that, when executed by processor 205, implement the inventive concept. This portion of memory is shown as 211. Another portion of memory, 212, is used to store tap coefficient values that are updated by processor 205 in accordance with the inventive concept. It is assumed that a received signal 201 is applied to processor 205, which equalizes this signal in accordance with the inventive concept to provide a output signal 206. For the purposes of example only, it is assumed that output signal 206 represents a sequence of output samples of the DFE. (As known in the art, a digital signal processor may, additionally, further process received signal 201 before deriving output signal 206.) An illustrative software program is not described herein since, after learning of the inventive concept as described herein, such a program is within the capability of one skilled in the art. Also, it should be noted that any equalizer structures, such as that described earlier, can be implemented by digital signal processor 200 in accordance with the inventive concept.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., a feedback filter, etc., the functions of any one or more of those building blocks can be carried out using one or more appropriately programmed processors or processing circuitry, e.g., a digital signal processor; discrete circuit elements; integrated circuits; etc.

What is claimed:

1. Apparatus comprising:
    a slicer for providing a sliced data signal;
    a noise source adder for adding a noise signal to the sliced data signal; and
    an adaptive feedback filter for processing the sliced data signal plus noise signal and for providing a signal that is fed back to the slicer.

2. The apparatus of claim 1 further comprising circuitry for combining the noise signal with the sliced data signal for providing a combined signal to the adaptive feedback filter.

3. The apparatus of claim 1 further comprising a feedforward filter such that the apparatus is a decision feedback equalizer.

4. A decision feedback equalizer comprising:
    a feedforward filter for processing a received signal;
    a feedback filter;
    a slicer, responsive to signals from the feedback filter and the feedforward filter for providing a sliced data signal; and
    a noise source adder for adding a noise signal to the sliced data signal;
    wherein the sliced data signal plus noise signal is processed by the feedback filter.

5. A decision feedback equalizer comprising:
    a non-adaptive equalizer for processing a received signal; and
    an adaptive equalizer for processing the received signal such that the adaptive equalizer implements a decision feedback equalizer comprising a feedback filter, a slicer which provides a sliced data signal, a noise source adder wherein a noise signal is added to the sliced data signal before processing by the feedback filter, and a signal path wherein tap coefficient values are subsequently transferred to the non-adaptive equalizer for use by the non-adaptive equalizer in processing the received signal.

6. Apparatus comprising:
    a processor; and
    memory for storing a program such that the processor implements a decision feedback equalizer comprising a slicer which provides a sliced data signal, a feedback filter, and a noise source adder wherein a noise signal is added to the sliced data signal before processing by the feedback filter.

7. A method for use in a decision feedback equalizer, the method comprising the steps of:
    adding a noise signal to a sliced data signal provided by the decision feedback equalizer; and
    filtering the sliced data signal plus noise signal with a feedback filter of the decision feedback equalizer.

* * * * *